(12) United States Patent
White et al.

(10) Patent No.: US 6,699,149 B1
(45) Date of Patent: Mar. 2, 2004

(54) IDLER PULLEY WITH A MULTIPLE POSITION LOCATING MECHANISM

(75) Inventors: Brian R. White, Stillwater, OK (US); Vince E. Notareschi, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 10 days.

(21) Appl. No.: 10/113,348

(22) Filed: Apr. 1, 2002

(51) Int. Cl.$^7$ ................................................. F16H 7/12
(52) U.S. Cl. ........................ 474/133; 474/118; 474/135
(58) Field of Search .......................... 474/101, 112, 474/113, 114, 118, 123, 124, 133, 135, 140

(56) References Cited

U.S. PATENT DOCUMENTS

| | | | |
|---|---|---|---|
| 3,763,715 A | | 10/1973 | Pollard et al. .................. 74/242 |
| 4,193,315 A | | 3/1980 | Noe .............................. 74/242 |
| 4,270,906 A | | 6/1981 | Kraft et al. ................... 474/135 |
| 4,439,173 A | * | 3/1984 | Fokos ........................... 474/191 |
| 4,713,044 A | | 12/1987 | Nakamura et al. ........... 474/135 |
| 4,725,260 A | * | 2/1988 | Komorowski et al. ....... 474/135 |
| 4,768,997 A | | 9/1988 | Page et al. ..................... 474/84 |
| 5,078,656 A | * | 1/1992 | Brandenstein et al. ....... 474/112 |
| 5,112,281 A | | 5/1992 | Minato et al. .................. 474/84 |
| 5,425,336 A | | 6/1995 | Nakayama .................... 123/198 |
| 5,489,243 A | | 2/1996 | Watanabe ..................... 474/135 |
| 5,752,892 A | * | 5/1998 | Taomo et al. ................. 474/112 |
| 6,083,131 A | * | 7/2000 | Katogi et al. ................. 474/110 |
| 2002/0134974 A1 | * | 9/2002 | Fujiwara et al. .............. 254/391 |

FOREIGN PATENT DOCUMENTS

GB 2156036 * 10/1985 ........... F16H/55/36

* cited by examiner

*Primary Examiner*—David A. Bucci
*Assistant Examiner*—Vicky A. Johnson
(74) *Attorney, Agent, or Firm*—William D. Lanyi

(57) ABSTRACT

An idler pulley is provided with a plurality of attachment locations, or holes, extending through a hub portion of the pulley to allow the pulley to be attached to a stationary object in a plurality of alternative configurations in order to provide a way for adjusting or selecting the tension of a belt used in conjunction with the idler pulley. Threaded fasteners pass through selected attachment locations of the hub portion of the idler pulley and are threaded into anchor locations on a stationary object, such as an internal combustion engine.

13 Claims, 4 Drawing Sheets

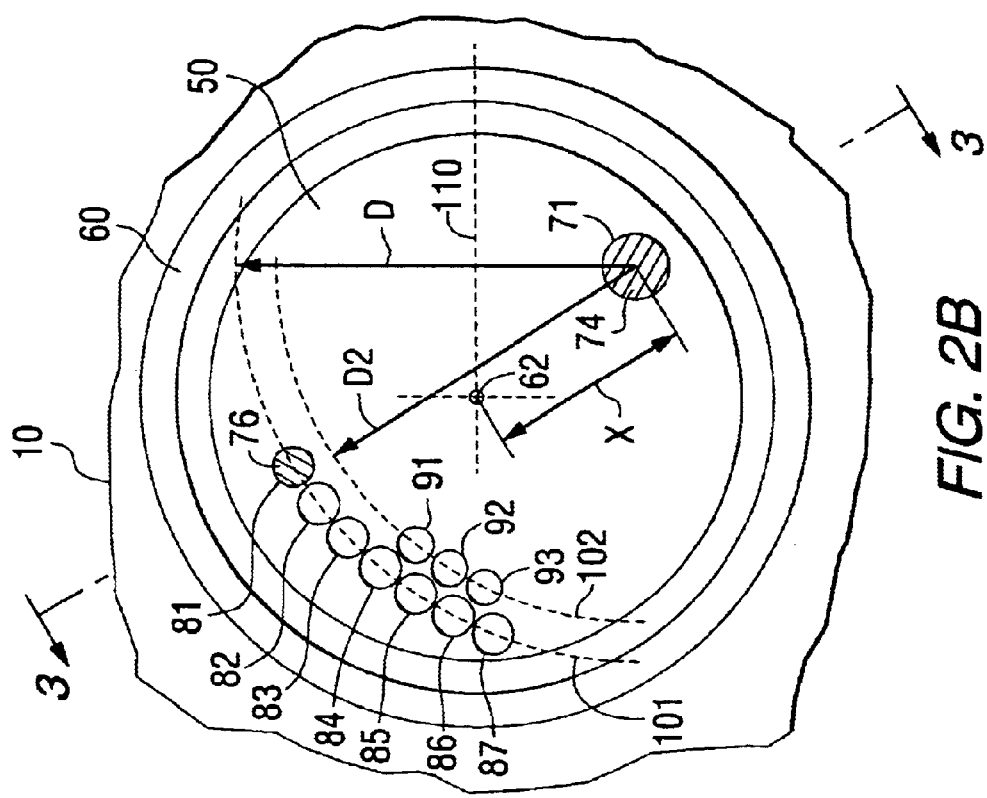
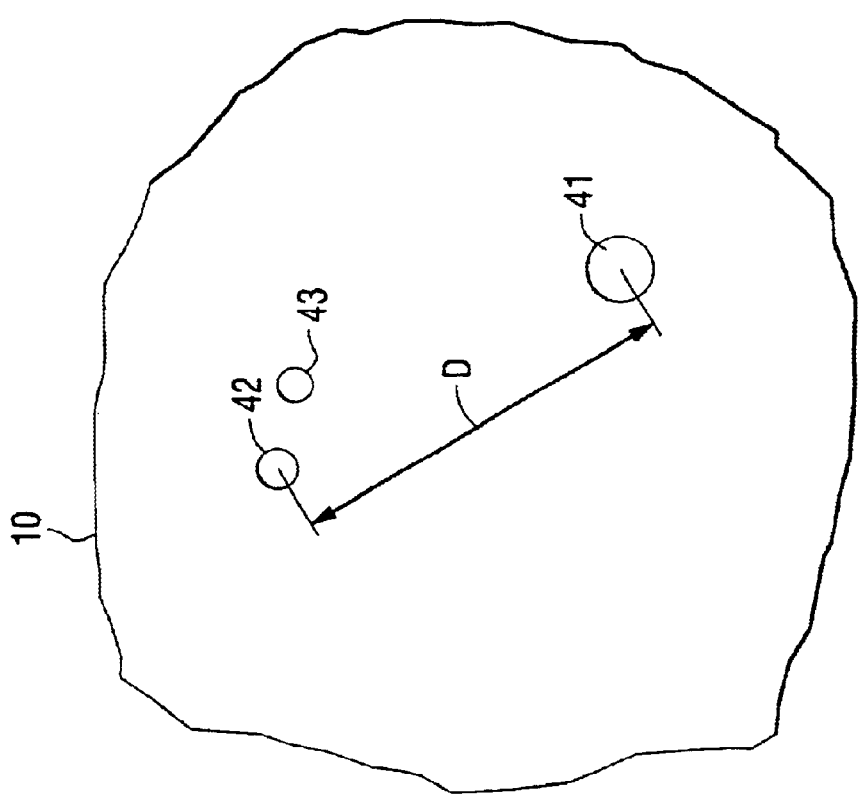

IDLER PULLEY WITH A MULTIPLE POSITION LOCATING MECHANISM

BACKGROUND OF THE INVENTION

1. Field of the Invention

The present invention is generally related to an idler pulley and, more specifically, to an idler pulley that can be manually relocated to a variety of positions to allow the idler pulley to be moved at an optimal position relative to an associated belt or chain.

2. Description of the Prior Art

In many applications where a drive belt is associated with a plurality of pulleys, an idler pulley is used to control the tension of the belt.

U.S. Pat. No. 5,489,243, which issued to Watanabe on Feb. 6, 1996, describes a timing belt tensioner for an engine. A drive arrangement for the cam shaft of an internal combustion engine employed in an outboard motor that includes a pivoted idler pulley that is disposed within the outer periphery of the flywheel, but which has a portion extending beyond the flywheel for adjustment without removing the flywheel is described.

U.S. Pat. No. 5,425,336, which issued to Nakayama on Jun. 20, 1995, describes an outboard motor. Two embodiments of a flexible transmitter tensioning device are described. They afford a screw threaded operation for moving an idler pulley to vary the adjustments. The construction lends itself to incorporation in an outboard motor.

U.S. Pat. No. 5,112,282, which issued to Minato et al on May 12, 1992, describes a driving system for auxiliaries of an engine and a method for adjusting tension of the belt for driving auxiliaries. Plural auxiliaries are independently driven by a belt to suppress an increase in the number of parts and simplify the structure. A cam shaft has first and second driving pulleys disposed in parallel to each other. A first auxiliary having a smaller load against the engine is movably mounted to the engine and has a first following pulley mounted to its operating shaft which is coaxially and rotatably mounted with an idle pulley. On the other hand, a second auxiliary having a larger load against the engine is fixed to the engine. To the engine is movably mounted a tension pulley. A first belt for driving the first auxiliary is wound around the first following pulley, the first driving pulley and a tension pulley, while a second belt for driving the second auxiliary is wound around the second driving pulley and the idle pulley. The tension of the first belt is adjusted by transferring the tension pulley, while the tension of the second belt is adjusted by transferring the first auxiliary.

U.S. Pat. No. 4,768,997, which issued to Page et al on Sep. 6, 1988, describes a belt drive system for dual input transmissions and transaxles. A two belt drive system is disclosed for lawn and garden tractors and other vehicles especially of the type including a variable speed transmission/transaxle having a constant speed rotational input, a variable speed rotational input and an output speed dependent on the rotational speed of the variable input. A first drive belt is mounted for rotation in one direction on an engine drive pulley, a first pulley of one of the transmission/transaxle inputs, and one pulley of a variable diameter pulley assembly. A second drive belt is mounted for rotation in the same direction as the first belt on a second pulley on the other transmission/transaxle input and the other pulley of the variable pulley assembly. Shifting the position of the variable pulley assembly with a hand control changes the belt receiving diameters of the variator pulleys such that the rotational speed of the second drive belt, second pulley, transmission/transaxle output, and resulting ground speed of the tractor are all adjustable with a hand control while the engine drives the first belt at a constant rotational speed.

U.S. Pat. No. 4,713,044, which issued to Nakamura et al on Dec. 15, 1987, describes a belt tensioner unit for an internal combustion engine or the like. The arm on which the idler pulley is supported as well as the tensioner which biases the arm to tension a timing belt or the like are both mounted on a common base plate. The plate is pivotally supported on the engine block and selectively securable in a desired position. A stopper mechanism which can be used to temporarily disable the biasing and damping functions of the tensioner enables automatic tension setting.

U.S. Pat. No. 4,270,906, which issued to Kraft et al on Jun. 2, 1981, describes a belt tensioner construction. A belt tensioner for an endless drive belt for vehicle accessories has a shaft which is mounted in a fixed position adjacent the belt. A lever is pivotally mounted on the shaft and has an idler pulley rotatably mounted on an extended end of the lever. The pulley is movable into tensioning engagement with the belt by rotation of the lever. A first cam plate is slidably mounted on the shaft and is engaged with a second cam plate which is attached to the lever for rotation with the lever. The cam plates each have a plurality of a series of camming surfaces which are mutually engageable with the opposite cam plate surfaces. A plurality of spring discs are telescopically mounted on the shaft and bias the first camming block into engagement with the second block applying a rotational force on the lever to move the pulley into tensioning relation with the drive belt. A hub is adjustably mounted on the shaft and is in abutting engagement with the springs to adjust the amount of camming force exerted on the lever, and correspondingly, on the belt by the idler pulley.

U.S. Pat. No. 4,193,315, which issued to Noe on Mar. 18, 1980, describes a belt drive system utilizing an adjustable idler mechanism. The adjustable idler mechanism is intended for use with a drive belt system in a laundry appliance. The idle mechanism includes first and second bell cranks pivoted about a common point and interconnected by a threaded member for adjustment with respect to each other to place tension on the drive belt. A solenoid is provided to disengage the idler mechanism from the drive belt from predetermined portions of a cycle of operations.

U.S. Pat. No. 3,763,715, which issued to Pollard et al on Oct. 9, 1973, describes an auxiliary tightener for fan belts on automobile engines. The auxiliary tightener for fan belts on automobile engines consists of an idler pulley on a movable mounting bracket located in the normal path of a fan belt on an automobile engine so as to relocate the path of the fan belt and thus enable the regular adjustable tensioning device to be effective in maintaining working tension on the belt. In some automobile engines having overhead cam shafts milling the head to increase the compression ratio in the engine results in lowering the cam shaft to a position where the usual fan belt drives the cam shaft, is incapable of maintaining proper frictional engagement with the drive pulleys of the engine. On such engines the use of the auxiliary tightener enables the cam shaft to be properly driven and the timing of the engine to be set as desired.

The patents described above are hereby expressly incorporated by reference in the description of the present invention.

It would be significantly beneficial if an idler pulley could be provided which allows it to be rigidly attached to a stationary object in any one of a preselected plurality of alternative positions relative to the stationary object. It would also be significantly beneficial if such a variably locatable idler pulley could be made with fewer required parts than idler pulleys which are known in the prior art.

SUMMARY OF THE INVENTION

An idler pulley made in accordance with the preferred embodiment of the present invention comprises a hub portion and a rotatable portion which is rotatable relative to the hub portion. The rotatable portion is rotatable about a central axis. A first attachment location, which can be a hole formed through the hub portion, is provided at a location which is displaced from the central axis of the rotatable portion. The first attachment location is shaped to be attachable to a first anchor location on a stationary object, such as an internal combustion engine. A second attachment location, which can be a second hole formed through the hub portion, is shaped to be attachable to a second anchor location on the stationary object. The hub portion is rigidly attachable to the stationary object when the first attachment location is attached to the first anchor location and the second attachment location is attached to the second anchor location.

In a preferred embodiment of the present invention, the central axis extends through the hub portion. A plurality of roller bearings is disposed between the hub portion and the rotatable portion. The first and second attachment locations are holes formed through the hub portion to allow threaded fasteners to pass through the holes and be attached to associated anchor locations on the stationary object. The rotatable portion of the idler pulley can be a crowned pulley.

In a preferred embodiment of the present invention, third and fourth attachment locations are formed on the hub portion and are shaped to be attachable, alternatively, to the second anchor location on the stationary object. The hub portion can be rigidly attached to the stationary object when the first attachment location is attached to the first anchor location and either of the second and third attachment locations are attached to the second anchor location. In a preferred embodiment of the present invention, the second, third, and fourth attachment locations are located on an arc of a first circle having its center at the first attachment location.

Fifth and sixth attachment locations can also be formed on the hub portion and shaped to be alternatively attachable to the second anchor location on the stationary object. The hub portion is rigidly attachable to the stationary object when the first attachment location is attached to the first anchor location and either the fifth or sixth attachment locations is attached to the second anchor location. The fifth and sixth attachment locations are located on an arc of a second circle having its center at the first attachment location. All of the attachment locations described above are holes formed through the hub portion in a preferred embodiment of the present invention.

BRIEF DESCRIPTION OF THE DRAWINGS

The present invention will be more fully and completely understood from a reading of the description of the preferred embodiment of the present invention in conjunction with the drawings, in which:

FIG. 2A shows anchor locations formed on a stationary object;

FIG. 2B shows an idler pulley made in accordance with the present invention and associated with the stationary object illustrated in FIG. 2A;

DESCRIPTION OF THE PREFERRED EMBODIMENT

Figure 1:
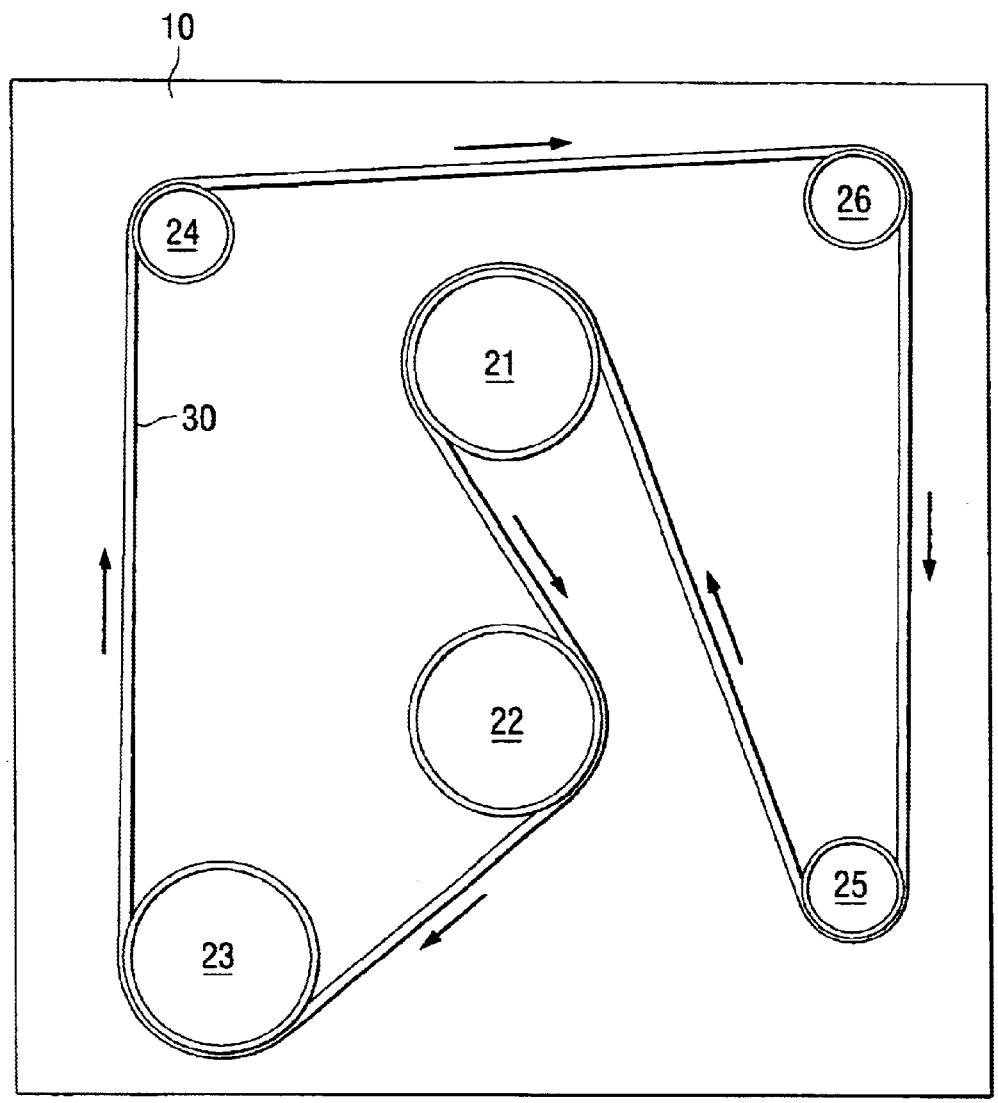
FIG. 1 shows a schematic representation of a stationary object and a plurality of pulleys.

Throughout the description of the preferred embodiment of the present invention, like components will be identified by like reference numerals.

FIG. 1 is a highly schematic representation showing an environment in which the present invention can be used. A stationary object 10, such as an internal combustion engine, is provided with a plurality of pulleys, 21–26, which are arranged at locations on the stationary object 10. If the stationary object 10 is an internal combustion engine, for example, pulley 21 can be attached to a cam shaft, pulley 22 can be attached to a crankshaft, pulley 23 can be attached to a water pump, and so on. Pulleys 24 and 25 can be attached to shafts of other auxiliary devices, (e.g. an electrical generator). In the arrangement shown in FIG. 1, pulley 26 is provided to serve as an idler pulley in order to maintain the proper tension on the belt 30. As the belt 30 moves in response to rotation of a primary drive pulley, such as pulley 22 which is attached to a crankshaft, torque is transmitted to the other pulleys. To provide the efficient transfer of torque from the primary drive pulley 22 to the other pulleys, the idler pulley 26 is positioned at a location to maintain the proper magnitude of tension on the drive belt 20.

In the Figures, the present invention will be described below in terms of a single first anchor location 41 about which the hub portion 50 can be rotated to select a different operating position. This first anchor location 41 is described below as being associated with the use of two groups of attachment locations such as those identified by reference numerals 81–87 and 91–93. However, it should be understood that alternative embodiments of the present invention could comprise more than one first anchor location 41 that are associated with a single group of attachment locations, such as those identified by reference numerals 81–87. In addition, although the embodiment of the present invention described below does not explicitly discuss any additional openings on the hub portion 50 which are provided for use in a positioning tool to rotate the hub portion 50 about the first anchor location 41, it is anticipated that at least a single hole will be provided to facilitate this adjustment procedure.

FIG. 2A is a simplified representation of a portion of the stationary object 10. A first anchor location 41 is provided on the stationary object 10. A second anchor location 42 is also provided on the stationary object 10. In a manner which will be described in greater detail below, the first and second anchor locations, 41 and 42, are provided in order to allow an idler pulley to be rigidly attached to the stationary object 10. A third anchor location 43 is optional and will be discussed below.

In a particularly preferred embodiment of the present invention, the first and second anchor locations, 41 and 42, can be threaded holes that are shaped to be associated in threaded association with threaded fasteners in order to rigidly attach the idler pulley to the stationary object 10. It should be clearly understood that the stationary object 10 is not part of the present invention but, instead, can be any stationary object to which the idler pulley is intended to be attached. The first and second anchor locations, 41 and 42, are spaced apart by a distance D as shown in FIG. 2A.

FIG. 2B shows an idler pulley that comprises a hub portion 50 and a rotatable portion 60. The rotatable portion 60 is rotatable relative to the hub portion 50 and about a central axis 62. A first attachment location 71 is formed on the hub portion 50 and displaced from the central axis 62 by a distance X as shown in FIG. 2B. It should be understood that the rotatable portion 60 does not rotate about the first location 71 during operation of the pulley. In a particularly preferred embodiment of the present invention, the first attachment location 71 is a hole formed through the thickness of the hub portion 50. Shown in cross section within the first attachment location 71 is a sectioned portion of a threaded fastener 74. The first attachment location 71 is shaped to be attachable to the first anchor location 41 on the stationary object 10, as described above in conjunction with FIG. 2A.

With continued reference to FIGS. 2A and 2B, a second attachment location 81 is formed on the hub portion 50 of the idler pulley. The second attachment location 81, is a particularly preferred embodiment of the present invention, is a hole formed through the hub portion 50. It is shaped to be attachable to the second anchor location 42 on the stationary object 10. The first and second anchor locations, 41 and 42, are visible in FIG. 2A, but are hidden by the presence of the idler pulley in FIG. 2B. A second threaded fastener 76 is illustrated as a sectioned view in FIG. 2B and located within the hole of the second attachment location 81. In FIG. 2B, the two sectioned views of the threaded fasteners, 74 and 76, mark the locations of the first and second anchor locations, 41 and 42, illustrated in FIG. 2A. The threaded fasteners, 74 and 76, pass through the holes of the first and second attachments locations, 71 and 81, and extend into the first and second anchor locations, 41 and 42. In a preferred embodiment of the present invention, the first and second anchor locations, 41 and 42, are threaded to receive the threaded ends of the two threaded fasteners, 74 and 76.

With continued reference to FIGS. 2A and 2B, the central axis 62 extends through the hub portion 50. As will be described below, a plurality of roller bearings is disposed between the hub portion 50 and the rotatable portion 60. The rotatable portion 60 is a crowned pulley in a preferred embodiment of the present invention.

Figure 3:
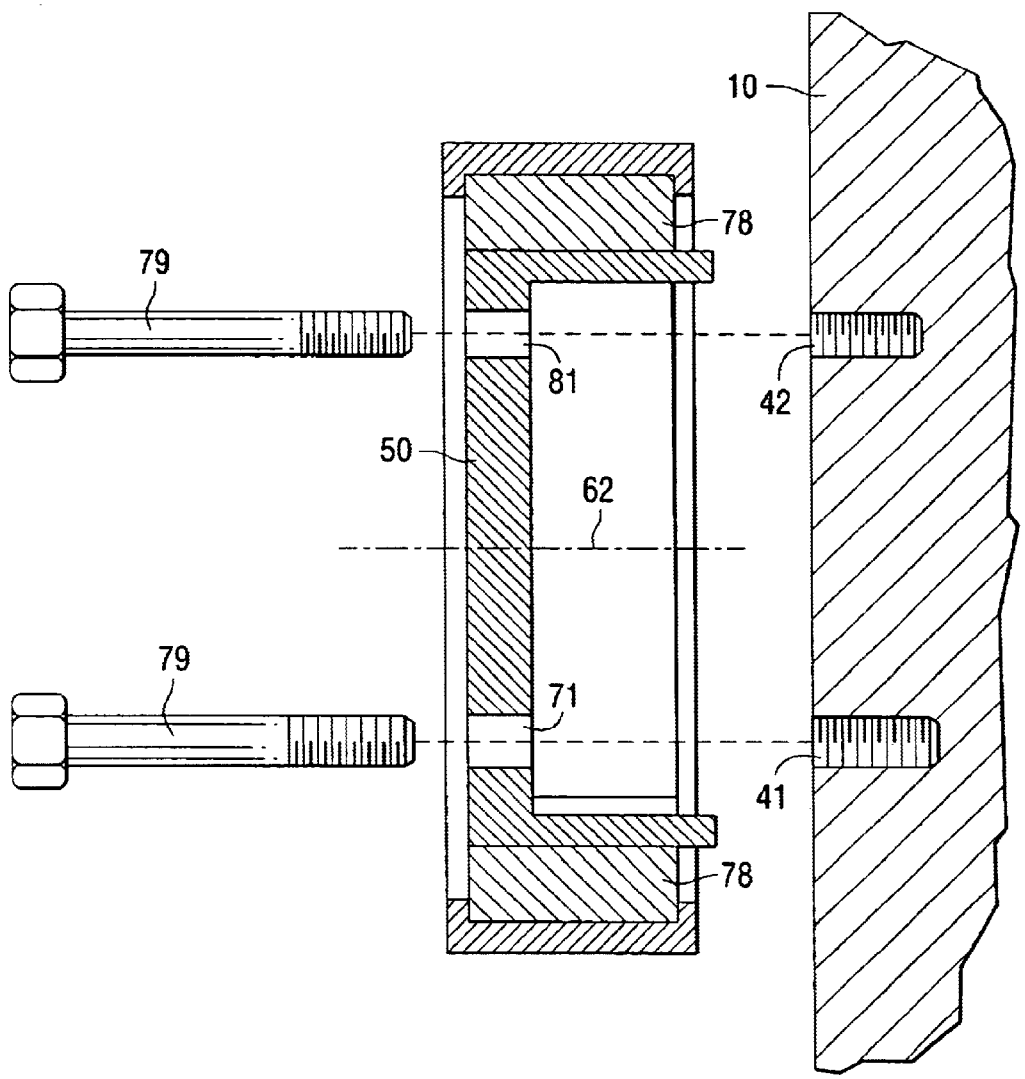
FIG. 3 is a section view taken through the idler pulley illustrated in FIG. 2B.

FIG. 3 is a section view of the idler pulley illustrated in FIG. 2B, showing the hub portion 50, the rotatable portion 60, and the roller bearings 78 disposed between the hub portion 50 and the rotatable portion 60. The stationary object 10 is schematically represented with the first and second anchor locations, 41 and 42. The section view of FIG. 3 shows the first attachment location 71 and the second attachment 81, but with the threaded fasteners 79 removed from the hub portion 50. When the threaded fasteners 79 are extended through their associated holes of the first and second attachment locations, 71 and 81, and threaded into the first and second anchor locations, 41 and 42, respectively, the hub portion 50 can be attached to the stationary object 10. Although not shown in FIG. 3, a boss portion or stand-off portion of the stationary object 10 would typically be provided proximate the center of the hub portion 50 to allow clearance of the rotatable portion 60 relative to the front face of the stationary object 10.

With reference to FIGS. 2B and 3, a third attachment location 82 is also formed on the hub portion 50 and shaped to be attachable to the second anchor location 42 on the stationary object 10. The hub portion can be rigidly attached to the stationary object 10 when the first attachment location 71 is attached to the first anchor location 41 and the third attachment location 82 is attached to the second anchor location 42. In other words, the second and third attachment locations, 81 and 82, are alternative holes through which a threaded fastener 79 can be extended to be threaded into the second anchor location 42. Similarly, a fourth attachment location 83, a fifth attachment location 84, a sixth attachment location 85, a seventh attachment location 86, or an eighth attachment location 87 can be used to allow a threaded fastener 79 to extend through their respective holes in the hub portion 50 to be threaded into the second anchor location 42 in order to rigidly attach the hub portion 50 of the idler pulley to the front face of the stationary object 10.

With continued reference to FIGS. 2A, 2B, and 3, it can be seen that other attachment locations, identified by reference numerals 91, 92, and 93 are also provided as holes extending through the thickness of the hub portion 50. The attachment locations identified by reference numerals 91–93 are identical to the attachment locations identified by reference numerals 81–87, but are located along a different arc. As can be seen in FIG. 2B, the attachment locations identified by reference numerals 81–87 are located on a first arc 101 of a first circle which has its center at the first attachment location 71. The attachment locations, 91–93, are located along a second arc 102 of a second circle which also has its center at the first attachment location 71. These dimensions are identified as "D" and "D2" in FIG. 2B. The distance D2 between the first attachment location 71 and any of the group of attachment locations, 91–93, located on the second arc 102 are arranged to allow a threaded fastener 79 to extend through attachment location 43 shown in FIG. 2A. It should be understood that the provision of two alternative locations, 42 and 43, for the second anchor location is optional and not required in all embodiments of the present invention. Similarly, the plurality of attachment locations identified by reference numerals 91–93 in FIG. 2B are not required in all embodiments of the present invention. All of the attachment locations of the present invention can be provided along the first arc 101, such as those illustrated in FIG. 2B and identified by reference numerals 81–87.

Figure 4:
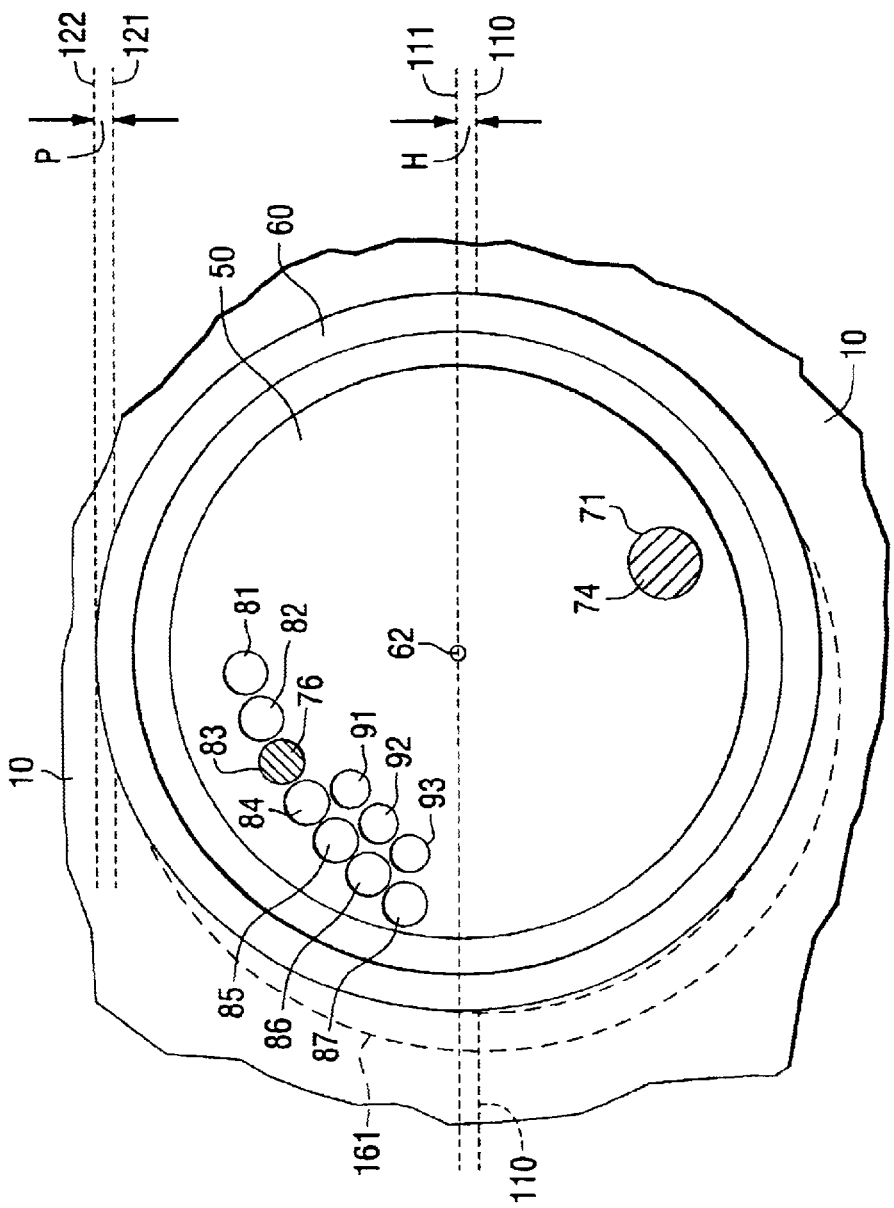
FIG. 4 shows two alternative positions of an idler pulley relative to a stationary object.

With reference to FIG. 2B, dashed line 110 is intended to represent a vertical position of the central axis 62 when threaded fasteners, 74 and 76, are inserted through the holes of the first and second attachment locations, 71 and 81, as shown in FIG. 2B. FIG. 4 is an illustration intended to show the resulting movement of the idler pulley as a result of the capability provided by the present invention. Reference numeral 161 identifies the outer circumference of the rotatable portion 60 in the position originally described in conjunction with FIG. 2B. Dashed line 110 represents the vertical position of the central axis 62 when the threaded fasteners 79 are inserted through the holes of the first and second attachment locations, 71 and 81. The solid line representation of the idler pulley in FIG. 4 shows the position of the idler pulley when the threaded fasteners 79, as represented by cross sectioned portions 74 and 76 in FIGS. 2B and 4, are inserted into the first attachment location 71 and the fourth attachment location 83. In order to accomplish this, the idler pulley is momentarily rotated about the center of the first attachment location 71 until the fourth attachment location 83 is aligned with the second anchor location 42 which is shown in FIG. 2A. This raises the vertical position of the central axis 62 to that which is represented by dashed line 111 in FIG. 4. A change in height, represented as "H" in FIG. 4 is achieved by the movement of the threaded fastener from the second attachment location 81 to the fourth attachment location 83 followed by the insertion of the threaded fasteners, 74 and 76, into the first and second anchor locations, 41 and 42, respectively. This also changes the height P of the rotatable portion 60 as represented by the movement of the uppermost edge of the idler pulley from the location represented by dashed line 121 to the location represented by dashed line 122. A change of this type would change the tension on the belt 30 described above in conjunction with FIG. 1.

With continued reference to FIG. 4, dimensions H and P can be changed to anyone of the plurality of magnitudes associated with the insertion of a threaded fastener 76, into the attachment locations identified by reference numerals 81–87. If a third anchor location 43 is provided on the stationary object 10, at a distance D2 from the first anchor location 41, the second arcuate row of attachment locations, 91–93, on the hub portion 50 can be used to achieve additional alternative magnitudes of dimensions H and P shown in FIG. 4.

Regardless of the attachments locations through which the threaded fasteners 79 are inserted to attach the hub portion 50 to the first and second, or third, anchor locations of the stationary object 10, the rotatable portion 60 of the idler pulley rotates about the central axis 62 during operation of the pulley. Although dimensions H and P can be changed to anyone of a plurality of alternative positions, the rotatable portion 60 continues to rotate about the central axis 62 during operation. This allows the belt tension to be appropriately changed to match changing conditions for alternative configurations of the belt 30.

The present invention has been described with regard to a rotatable portion 60 that rotates around the outside of a hub portion 50. It should be understood that the reverse could also be true within the scope of the present invention. An internally rotatable portion 60 can be disposed within a central opening of a hub portion 50 that extends around the rotatable portion 60. In addition, although the preferred embodiment of the present invention has been described in terms of a plurality of holes, 81–87, 91–93, and 71, it should be understood that alternative attachment location configurations are within the scope of the present invention. For example, protrusions can be formed at the attachment locations and shaped to be received within cavities formed in the stationary object at the locations identified by reference numerals 41–43. Also, although the present invention has been described in association with a crowned pulley for the rotatable portion 60 and with a plurality of bearings disposed between the hub portion 50 and the rotatable portion 60, it should be understood that alternative configurations are also within the scope of the present invention. In addition, although only two alternative positions are represented in FIG. 4, as described above, 10 possible alternative positions are also within the scope of the present invention when the ten attachment locations are provided along the first and second arcs, 101 and 102. In other embodiments, even more holes can be provided.

Although the present invention has been described with particular detail and illustrated to show a preferred embodiment, it should be understood that alternative embodiments are also within its scope.

We claim:

1. An idler pulley, comprising:
   a hub portion;
   a rotatable portion which is rotatable relative to said hub portion and about a central axis;
   a first attachment location formed on said hub portion, said first attachment location being displaced from said central axis, said first attachment location shaped be attachable to a first anchor location on a stationary object;
   a second attachment location formed on said hub portion, said second attachment location being shaped to be attachable to a second anchor location on said stationary object, said hub portion being rigidly attachable to said stationary object when said first attachment location is attached to said first anchor location and said second attachment location is attached to said second anchor location; and
   a third attachment location formed on said hub portion, said third attachment location being shaped to be attachable to said second anchor location on said stationary object, said hub portion being rigidly attachable to said stationary object when said first attachment location is attached to said first anchor location and said third attachment location is attached to said second anchor location, said second and third attachment locations being located on an arc of a first circle having its center at said first attachment location.

2. The idler pulley of claim 1, wherein:
   said central axis extends through said hub portion.

3. The idler pulley of claim 1, further comprising:
   a plurality of roller bearings disposed between said hub portion and said rotatable portion.

4. The idler pulley of claim 1, wherein:
   said first attachment location is a hole formed through said hub portion; and
   said second attachment location is a hole formed through said hub portion.

5. The idler pulley of claim 1, wherein:
   a fourth attachment location formed on said hub portion, said fourth attachment location being shaped to be attachable to said second anchor location on said stationary object, said hub portion being rigidly attachable to said stationary object when said first attachment location is attached to said first anchor location and said fourth attachment location is attached to said second anchor location, said second, third, and fourth attachment locations being located on said arc of said first circle having its center at said first attachment location.

6. The idler pulley of claim 5, further comprising:
   a fifth attachment location formed on said hub portion, said fifth attachment location being shaped to be attachable to said second anchor location on said stationary object, said hub portion being rigidly attachable to said stationary object when said first attachment location is attached to said first anchor location and said fifth attachment location is attached to said second anchor location; and
   a sixth attachment location formed on said hub portion, said sixth attachment location being shaped to be attachable to said second anchor location on said stationary object, said hub portion being rigidly attachable to said stationary object when said first attachment location is attached to said first anchor location and said sixth attachment location is attached to said second anchor location, said fifth and sixth attachment locations being located on an arc of a second circle having its center at said first attachment location.

7. The idler pulley of claim 6, wherein:
   said second, third, fourth, fifth, and sixth attachment locations are second, third, fourth, fifth, and sixth holes, respectively, formed through said hub portion.

8. An idler pulley, comprising:

a hub portion;

a rotatable portion which is rotatable relative to said hub portion and about a central axis;

a first attachment hole formed through said hub portion, said first attachment hole being displaced from said central axis, said first attachment hole being shaped to be attachable to a first threaded anchor opening of a stationary object by a first threaded fastener;

a second attachment hole formed through said hub portion, said second attachment hole being shaped to be attachable to a second threaded anchor opening of said stationary object by a second threaded fastener, said hub portion being rigidly attachable to said stationary object when said first attachment hole is attached to said first threaded anchor opening by said first threaded fastener and said second attachment hole is attached to said second threaded anchor opening by said second threaded fastener;

a plurality of roller bearings disposed between said hub portion and said rotatable portion, said central axis extending through said hub portion; and a third attachment hole formed through said hub portion, said third attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said third attachment hole is attached to said second threaded anchor opening by said second threaded fastener.

9. The idler pulley of claim 8, further comprising:

a fourth attachment hole formed through said hub portion, said fourth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said fourth attachment hole is attached to said second threaded anchor opening by said second threaded fastener, said second, third, and fourth attachment holes being located on an arc of a first circle having its center at said first attachment hole.

10. The idler pulley of claim 9, further comprising:

a fifth attachment hole formed through said hub portion, said fifth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said fifth attachment hole is attached to said second threaded anchor opening by said second threaded fastener, said fifth attachment hole being located on an arc of a second circle having its center at said first attachment hole.

11. The idler pulley of claim 10, further comprising:

a sixth attachment hole formed through said hub portion, said sixth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said sixth attachment hole is attached to said second threaded anchor opening by said second threaded fastener, said sixth attachment hole being located on said arc of said second circle having its center at said first attachment hole.

12. An idler pulley, comprising:

a hub portion;

a rotatable portion which is rotatable relative to said hub portion and about a central axis;

a first attachment hole formed through said hub portion, said first attachment hole being displaced from said central axis, said first attachment hole being shaped to be attachable to a first threaded anchor opening of a stationary object by a first threaded fastener;

a second attachment hole formed through said hub portion, said second attachment hole being shaped to be attachable to a second threaded anchor opening of said stationary object by a second threaded fastener, said hub portion being rigidly attachable to said stationary object when said first attachment hole is attached to said first threaded anchor opening by said first threaded fastener and said second attachment hole is attached to said second threaded anchor opening by said second threaded fastener;

a plurality of roller bearings disposed between said hub portion and said rotatable portion; said central axis extending through said hub portion;

a third attachment bole formed through said hub portion, said third attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said third attachment hole is attached to said second threaded anchor opening by said second threaded fastener; and a fourth attachment hole formed through said hub portion, said fourth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said fourth attachment hole is attached to said second threaded anchor opening by said second threaded fastener, said second, third, and fourth attachment holes being located on an arc of a first circle having its center at said first attachment hole.

13. The idler pulley of claim 12, further comprising:

a fifth attachment hole formed through said hub portion, said fifth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said fifth attachment hole is attached to said second threaded anchor opening by said second threaded fastener, said fifth attachment hole being located on an arc of a second circle having its center at said first attachment hole; and a sixth attachment hole formed through said hub portion, said sixth attachment hole being shaped to be attachable to said second threaded anchor opening of said stationary object by said second threaded fastener, said hub portion being rigidly attachable to said stationary object when said first attachment hole is attached to said first threaded anchor opening by said first threaded fastener and said sixth attachment hole is attached to said second threaded anchor opening by said second threaded fastener, said sixth attachment hole being located on said arc of said second circle having its center at said first attachment hole.

* * * * *